United States Patent [19]

Halasa et al.

[11] Patent Number: 4,696,986

[45] Date of Patent: Sep. 29, 1987

[54] MODIFIER FOR LITHIUM CATALYSTS

[75] Inventors: Adel F. Halasa, Bath; Robert E. Cunningham, Akron, both of Ohio

[73] Assignee: The Goodyear Tire & Rubber Company, Akron, Ohio

[21] Appl. No.: 895,646

[22] Filed: Aug. 12, 1986

[51] Int. Cl.$^4$ .............................................. C08F 4/46
[52] U.S. Cl. .................................................. 526/181
[58] Field of Search ................................ 526/181, 173

[56] References Cited

U.S. PATENT DOCUMENTS 3,673,166  6/1972  Trepka et al. ....................... 526/181
3,948,872  4/1976  Trepka et al. ....................... 526/181

FOREIGN PATENT DOCUMENTS 46-11512  3/1971  Japan ................................... 526/181

Primary Examiner—Peter F. Kulkosky
Attorney, Agent, or Firm—Alvin T. Rockhill

[57] ABSTRACT

It has been determined that 1,2,3-trialkoxybenzenes and 1,2,4-trialkoxybenzenes can be utilized in order to increase the vinyl content of polydienes which are prepared utilizing lithium catalyst systems. For instance, it has been determined that 1,2,3-trimethoxybenzene and 1,2,4-trimethoxybenzene are very strong modifiers for utilization in such polymerizations. The utilization of the trialkoxybenzene modifiers of the present invention is highly advantageous because they promote fast polymerization rates and can be used to produce polymers having high vinyl contents.

23 Claims, No Drawings

MODIFIER FOR LITHIUM CATALYSTS

BACKGROUND OF THE INVENTION

It is important for polydienes which are used in many applications to have high vinyl contents. Polar modifiers are commonly used in the preparation of synthetic polydiene rubbers which are prepared utilizing lithium catalyst systems in order to increase their vinyl content. Ethers and tertiary amines which act as Lewis bases are commonly used as modifiers. For instance, U.S. Pat. No. 4,022,959 indicates that diethyl ether, di-n-propyl ether, diisopropyl ether, di-n-butyl ether, tetrahydrofuran, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N,N,N',N'-tetramethylethylenediamine, N-methyl morpholine, N-ethyl morpholine, and N-phenyl morpholine can be used as modifiers. The vinyl group content of polydienes prepared utilizing such Lewis bases as modifiers depends upon the type and amount of Lewis base employed as well as the polymerization temperature utilized. For example, if a higher polymerization temperature is employed, a polymer with a lower vinyl group content is obtained (see A. W. Langer; A. Chem. Soc. Div. Polymer Chem. Reprints; Vol. 7 (1), 132 [1966]). For this reason it is difficult to synthesize polymers having high vinyl contents at high polymerization temperatures utilizing typical Lewis base modifiers.

Higher temperatures generally promote a faster rate of polymerization. Accordingly, it is desirable to utilize moderately high temperatures in commercial polymerizations in order to maximize throughputs. However, it has traditionally been difficult to prepare polymers having high vinyl contents at temperatures which are high enough to attain maxium polymerization rates while utilizing conventional Lewis bases as modifiers.

SUMMARY OF THE INVENTION

It has been determined that 1,2,3,-trialkoxybenzenes and 1,2,4-trialkoxybenzenes can be used as modifiers in the synthesis of polydienes. Such polydienes are prepared utilizing lithium catalyst systems which are generally organolithium compounds. The trialkoxybenzenes used in accordance with this invention are very strong modifiers: the use of which can result in the formation of polymers with very high vinyl contents.

The trialkoxybenzene modifiers of this invention remain stable at conventional polymerization temperatures and lead to the formation of polymers having high vinyl contents at such temperatures. Accordingly, they can be used to promote the formation of high vinyl polymers at temperatures which are high enough to promote very fast polymerization rates.

The present invention specifically discloses a process for preparing a vinyl group containing polymer comprising polymerizing at least one diolefin monomer in the presence of a catalyst system which is comprised of (a) at least one organolithium compound and (b) at least one trialkoxybenzene modifier selected from the group consisting of 1,2,3-trialkoxybenzenes and 1,2,4-trialkoxybenzenes, wherein the alkyl groups in said trialkoxybenzenes contain from 1 to about 10 carbon atoms.

DETAILED DESCRIPTION OF THE INVENTION

The polymers which can be prepared utilizing the trialkoxybenzene modifiers of the present invention are organolithium-initiated, vinyl group containing polymers of at least one diolefin monomer. The diolefin monomers utilized in the preparation of such polymers normally contain from 4 to 12 carbon atoms with those containing from 4 to 8 carbon atoms being more commonly utilized. The diolefin monomers used in such polymers are normally conjugated diolefins.

The conjugated diolefin monomers which are utilized in the synthesis of such polymers generally contain from 4 to 12 carbon atoms. Those containing from 4 to 8 carbon atoms are generally preferred for commercial purposes. For similar reasons, 1,3-butadiene and isoprene are the most commonly utilized conjugated diolefin monomers. Some additional conjugated diolefin monomers that can be utilized include 2, 3-dimethyl-1,3-butadiene, piperylene, 3-butyl-1,3-octadiene, 2-phenyl-1,3-butadiene, and the like, alone or in admixture.

Feed stocks which are comprised of one or more conjugated diolefin monomers in admixture with other low molecular weight hydrocarbons can be utilized. Such admixtures, termed low concentration diene streams, are obtainable from a variety of refinery product streams, such as naptha-cracking operations or can be intentionally blended compositions. Some typical examples of low molecular weight hydrocarbons which can be admixed with diolefin monomers, such as 1,3-butadiene, in the polymerization feed include propane, propylene, isobutane, n-butane, 1-butene, isobutylene, trans-2-butene, cis-2-butene, vinylacetylene, cyclohexane, ethylene, propylene, and the like.

Copolymers of one or more diolefin monomers having high vinyl contents can also be prepared utilizing the trialkoxybenzene modifiers of the present invention. For instance, copolymers of isoprene and butadiene having high vinyl contents can be synthesized.

Polydiene rubbers having high vinyl contents which are copolymers or terpolymers of diolefin monomers with one or more other ethylenically unsaturated monomers can also be prepared utilizing the modifiers of this invention. Some representative examples of ethylenically unsaturated monomers that can potentially be synthesized into such high vinyl polymers include alkyl acrylates, such as methyl acrylate, ethyl acrylate, butyl acrylate, methyl methacrylate and the like; vinylidene monomers having one or more terminal $CH_2=CH-$ groups; vinyl aromatics such as styrene, α-methylstyrene, bromostyrene, chlorostyrene, fluorostyrene and the like; α-olefins such as ethylene, propylene, 1-butene, and the like; vinyl halides, such as vinylbromide, chloroethane (vinylchloride), vinylfluoride, vinyliodide, 1,2-dibromoethene, 1,1-dichloroethene (vinylidene chloride), 1,2-dichloroethene, and the like; vinyl esters, such as vinyl acetate; α, β-olefinically unsaturated nitriles, such as acrylonitrile and methacrylonitrile; α, β-olefinically unsaturated amides, such as acrylamide, N-methyl acrylamide, N,N-dimethylacrylamide, methacrylamide and the like.

Polydiene rubbers which are copolymers of one or more diene monomers with one or more other ethylenically unsaturated monomers will normally contain from about 50 weight percent to about 99 weight percent diene monomers and from about 1 weight percent to about 50 weight percent of the other ethylenically unsaturated monomers in addition to the diene monomers. For example, copolymers of diene monomers with vinylaromatic monomers, such as styrene-butadiene rubber (SBR) which contain from 50 to 95 weight percent diene monomers and from 5 to 50 weight percent vinylaromatic monomers are useful in many applications.

Vinyl aromatic monomers are probably the most important group of ethylenically unsaturated monomers which are commonly incorporated into polydienes. Such vinyl aromatic monomers are, of course, selected so as to be copolymerizable with the diolefin monomers being utilized. Generally, any vinyl aromatic monomer which is known to polymerize with organolithium initiators can be used. Such vinyl aromatic monomers typically contain from 8 to 20 carbon atoms. Usually the vinyl aromatic monomer will contain from 8 to 14 carbon atoms. The most widely used vinyl aromatic monomer is styrene. Some examples of vinyl aromatic monomers that can be utilized include 1-vinylnaphthalene, 2-vinylnaphthalene, 3-methylstyrene, 4-propylstyrene, 4-cyclohexylstyrene, 4-dodecylstyrene, 2-ethyl-4-benzylstyrene, 4-(phenylbutyl)styrene, and the like.

The relative amount of conjugated diene or dienes and monovinyl aromatic compound or compounds employed can vary over a wide range. In preparing rubbery polymers, the proportion of the conjugated diene versus the monovinyl-substituted aromatic compound should be sufficient so as to result in a substantially rubbery or elastomeric copolymer product. There is no sharp break point as to the amount of conjugated diene versus monovinyl-substituted aromatic compound that confers rubbery or elastomeric properties on the resulting copolymer, though in general at least 50 parts by weight of conjugated diene are required on an exemplary basis. Thus, for a rubbery copolymer, as is preferred in accordance with this invention, the weight ratio of conjugated diene to monovinyl aromatic compound in the monomer charge would be in the range of about 50:50 to 95:5. Of course, mixtures of conjugated dienenes as well as mixtures of monovinyl-substituted aromatic compounds can be utilized.

The polymerizations of the present invention which are carried out in the presence of a trialkoxybenzene modifier will normally be carried out in a hydrocarbon solvent which can be one or more aromatic, paraffinic, or cycloparaffinic compounds. These solvents will normally contain from 4 to 10 carbon atoms per molecule and will be liquids under the conditions of the polymerization. Some represent examples of suitable organic solvents include pentane, isooctane, cyclohexane, normal hexane, benzene, toluene, xylene, ethylbenzene, and the like, alone or in admixture. The trialkoxybenzene modifiers of this invention are also useful in bulk polymerizations which are initiated with lithium catalyst systems.

In solution polymerizations which utilize the trialkoxybenzene modifiers of this invention, there will normally be from 5 to 35 weight percent monomers in the polymerization medium. Such polymerization mediums are, of course, comprised of an organic solvent, monomers, an organolithium initiator, and a trialkoxybenzene modifier. In most cases it will be preferred for the polymerization medium to contain from 10 to 30 weight percent monomers. It is generally more preferred for the polymerization medium to contain 20 to 25 weight percent monomers.

The organolithium initiators employed in the process of this invention include the monofunctional and multifunctional types known for polymerizing the monomers described herein. The multifunctional organolithium initiators can be either specific organolithium compounds or can be multifunctional types which are not necessarily specific compounds but rather represent reproducible compositions of regulable functionality.

The amount of organolithium initiator utilized will vary with the monomers being polymerized and with the molecular weight that is desired for the polymer being synthesized. However, as a general rule from 0.01 to 1 phm (parts per 100 parts by weight of monomer) of an organolithium initiator will be utilized. In most cases, from 0.01 to 0.1 phm of an organolithium initiator will be utilized with it being preferred to utilize 0.025 to 0.07 phm of the organolithium initiator.

The choice of initiator can be governed by the degree of branching and the degree of elasticity desired for the polymer, the nature of the feedstock, and the like. With regard to the feedstock employed as the source of conjugated diene, for example, the multifunctional initiator types generally are preferred when a low concentration diene stream is at least a portion of the feedstock, since some components present in the unpurified low concentration diene stream may tend to react with carbon lithium bonds to deactivate initiator activity, thus necessitating the presence of sufficient lithium functionality in the initiator so as to override such effects.

The multifunctional initiators which can be used include those prepared by reacting an organomonolithium compounded with a multivinylphosphine or with a multivinylsilane, such a reaction preferably being conducted in an inert diluent such as a hydrocarbon or a mixture of a hydrocarbon and a polar organic compound. The reaction between the multivinylsilane or multivinylphosphine and the organomonolithium compound can result in a precipitate which can be solubilized if desired, by adding a solubilizing monomer such as a conjugated diene or monovinyl aromatic compound, after reaction of the primary components. Alternatively, the reaction can be conducted in the presence of a minor amount of the solubilizing monomer. The relative amounts of the organomonolithium compound and the multivinylsilane or the multivinylphosphine preferably should be in the range of about 0.33 to 4 moles of organomonolithium compound per mole of vinyl groups present in the multivinylsilane or multivinylphosphine employed. It should be noted that such multifunctional initiators are commonly used as mixtures of compounds rather than as specific individual compounds.

Exemplary organomonolithium compounds include ethyllithium, isopropyllithium, n-butyllithium, sec-butyllithium, tert-octyllithium, n-eicosyllithium, phenyllithium, 2-naphthyllithium, 4-butylphenyllithium, 4-tolyllithium, 4-phenylbutyllithium, cyclohexyllithium, and the like.

Exemplary multivinylsilane dompounds include tetravinylsilane, methyltrivinylsilane, diethyldivinylsilane, di-n-dodecyldivinylsilane, cyclohexyltrivinylsilane, phenyltrivinylsilane, benzyltrivinylsilane, (3-ethylcyclohexyl) (3-n-butylphenyl)divinylsilane, and the like.

Exemplary multivinylphosphine compounds include trivinylphosphine, methyldivinylphosphine, dodecyldivinylphosphine, phenyldivinylphosphine, cyclooctyldivinylphosphine, and the like.

Other multifunctional polymerization initiators can be prepared by utilizing an organomonolithium compound, further together with a multivinylaromatic compound and either a conjugated diene or monovinylaromatic compound or both. These ingredients can be charged initially, usually in the presence of a hydrocarbon or a mixture of a hydrocarbon and a polar organic compound as diluent. Alternatively, a multifunctional polymerization initiator can be prepared in a two-step process by reacting the organomonolithium compound with a conjugated diene or monovinyl aromatic compound additive and then adding the multivinyl aromatic compound. Any of the conjugated dienes or monovinyl aromatic compounds described can be employed. The ratio of conjugated diene or monovinyl aromatic compound additive employed preferably should be in the range of about 2 to 15 moles of polymerizable compound per mole of organolithium compound. The amount of multivinylaromatic compound employed preferably should be in the range of about 0.05 to 2 moles per mole of organomonolithium compound.

Exemplary multivinyl aromatic compounds include 1,2-divinylbenzene, 1,3-divinylbenzene, 1,4-divinylbenzene, 1,2,4-trivinylbenzene, 1,3-divinylnaphthalene, 1,8-divinylnaphthalene, 1,3,5-trivinylnaphthalene, 2,4-divinylbiphenyl, 3,5,4'-trivinylbiphenyl, m-diisopropenyl benzene, p-diisopropenyl benzene, 1,3-divinyl-4,5,8-tributylnaphthalene, and the like. Divinyl aromatic hydrocarbons containing up to 18 carbon atoms per molecule are preferred, particularly divinylbenzene as either the ortho, meta, or para isomer, and commercial divinylbenzene, which is a mixture of the three isomers, and other compounds such as the ethylstyrenes, also is quite satisfactory.

Other types of multifunctional initiators can be employed such as those prepared by contacting a sec- or tert-organomonolithium compound with 1,3-butadiene, on a ratio of such as about 2 to 4 moles of organomonolithium compound per mole of 1,3-butadiene, in the absence of added polar material in this instance, with the contacting preferably being conducted in an inert hydrocarbon diluent, though contacting without the diluent can be employed if desired.

Alternatively, specific organolithium compounds can be employed as initiators, if desired, in the preparation of polymers in accordance with the present invention. These can be represented by R (Li)$_x$ wherein R represents a hydrocarbyl radical of such as 1 to 20 carbon atoms per R group, and x is an integer of 1 to 4. Exemplary organolithium compounds are methyllithium, isopropyllithium, n-butyllithium, sec-butyllithium, tert-octyllithium, n-decyllithium, phenyllithium, 1-naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butane, 1,8-dilithio-3-decene, 1,2-dilithio-1,8-diphenyloctane, 1,4-dilithiobenzene, 1,4-dilithionaphthalene, 9,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and the like.

The trialkoxybenzene modifiers which can be employed in the synthesis of polydienes having high vinyl contents include 1,2,3-trialkoxybenzenes and 1,2,4-trialkoxybenzenes. The alkyl groups in these trialkoxybenzene modifiers generally contain from 1 to about 10 carbon atoms. In most cases the alkyl groups in the trialkoxybenzene modifiers will contain from 1 to 6 carbon atoms with those containing 1 to 4 carbon atoms being more common.

The 1,2,3-trialkoxybenzenes which can be used have the structural formula:

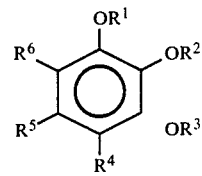

and the 1,2,4-trialkoxybenzenes which can be used have the structural formula:

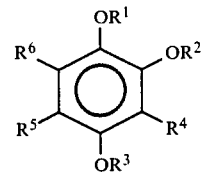

wherein $R^1$, $R^2$, and $R^3$ represent alkyl groups which can be the same or different and which contain from 1 to about 10 carbon atoms; and wherein $R^4$, $R^5$, and $R^6$ can be the same or different and represent hydrogen atoms or alkyl groups which contain from 1 to about 10 carbon atoms. Some representative examples of 1,2,3-trialkoxybenzenes that can be used include 1,2,3-trimethoxybenzene, 1,2,3-triethoxybenzene, 1,2,3-tributoxybenzene, 1,2,3-trihexoxybenzene, 4,5,6-trimethyl-1,2,3-trimethoxybenzene, 4,5,6-tri-n-pentyl-1,2,3-triethoxybenzene, 5-methyl-1,2,3-trimethoxybenzene, and 5-propyl-1,2,3-trimethoxybenzene. Some representative examples of 1,2,4-trialkoxybenzenes that can be used include 1,2,4-trimethoxybenzene, 1,2,4-triethoxybenzene, 1,2,4-tributoxybenzene, 1,2,4-tripentoxybenzene, 3,5,6-trimethyl-1,2,4-trimethoxybenzene, 5-propyl-1,2,4-trimethoxybenzene, and 3,5-dimethyl-1,2,4-trimethoxybenzene.

The trialkoxybenzene modifier being utilized can be introduced into the polymerization zone being utilized in any manner. In one embodiment, it can be reacted with an organolithium compound with the reaction mixture therefrom being introduced into the polymerization zone as the initiator. In another embodiment, the trialkoxybenzene modifier can be introduced into the polymerization zone directly without first being reacted with the organolithium compound being utilized. In other words, the trialkoxybenzene modifiers can be introduced into the polymerization zone in the form of a reaction mixture with the organolithium catalyst or they can be introduced into the polymerization zone separately.

The amount of trialkoxybenzene modifier needed will vary greatly with the vinyl content which is desired for the polymer being synthesized. For instance, polymers with only slightly increased vinyl contents can be prepared by utilizing as little as 0.1 moles of the trialkoxybenzene modifier per mole of lithium in the lithium catalyst being utilized. If polymers having very high vinyl contents are desired, then large quantities of the trialkoxybenzene modifier can be used. However, normally there will be no reason to employ more than about 40 moles of the trialkoxybenzene modifier per mole of lithium in the lithium catalyst system employed. In most cases from about 0.25 to about 15 moles of the trialkoxybenzene modifier will be employed per mole of lithium in the lithium catalyst system utilized. Preferably from about 0.5 to 10 moles of the trialkoxybenzene modifier will be utilized per mole of lithium with from about 1 to 5 moles of the trialkoxybenzene modifier per mole of lithium being most preferred.

The polymerization temperature utilized can vary over a broad range of from about −20° C. to about 150° C. In most cases a temperature within the range of about 30° C. to about 125° C. will be utilized. The pressure used will normally be sufficient to maintain a substantially liquid phase under the conditions of the polymerization reaction.

The polymerization is conducted for a length of time sufficient to permit substantially complete polymerization of monomers. In other words, the polymerization is normally carried out until high conversions are attained. The polymerization can then be terminated using a standard technique. The polymerization can be terminated with a conventional noncoupling type of terminator, such as water, an acid, a lower alcohol, and the like or with a coupling agent.

Coupling agents can be used in order to improve the cold flow characteristics of the rubber and rolling resistance of tires made therefrom. It also leads to better processability and other beneficial properties. A wide variety of compounds suitable for such purposes can be employed. Some representative examples of suitable coupling agents include: agents are the multivinylaromatic compounds, multiepoxides, multiisocyanates, multiimines, multialdehydes, multiketones, multihalides, multianhydrides, multiesters which are the esters of polyalcohols with monocarboxylic acids, and the diesters which are esters of monohydric alcohols with dicarboxylic acids, and the like.

Examples of suitable multivinylaromatic compounds include divinylbenzene, 1,2,4-trivinylbenzene, 1,3-divinylnaphthalene, 1,8-divinylnaphthalene, 1,3,5-trivinylnaphthalene, 2,4-divinylbiphenyl, and the like. The divinylaromatic hydrocarbons are preferred, particularly divinylbenzene in either its ortho, meta, or para isomer. Commercial divinylbenzene which is a mixture of the three isomers and other compounds is quite satisfactory.

While any multiepoxide can be used, we prefer those which are liquid since they are more readily handled and form a relatively small nucleus for the radial polymer. Especially preferred among the multiepoxides are the epoxidized hydrocarbon polymers such as epoxidized liquid polybutadienes and the epoxidized vegetable oils such as epoxidized soybean oil and epoxidized linseed oil. Other epoxy compounds such as 1,2,5,6,9,10-triepoxydecane, and the like, also can be used.

Examples of suitable multiisocyanates include benzene-1,2,4-triisocyanate, naphthalene-1,2,5,7-tetraisocyanate, and the like. Especially suitable is a commercially available product known as PAPI-1, a polyarylpolyisocyanate having an average of 3 isocyanate groups per molecule and an average molecular weight of about 380. Such a compound can be visualized as a series of isocyanate-substituted benzene rings joined through methylene linkages.

The multiimines, which are also known as multiaziridinyl compounds, preferably are those containing 3 or more aziridine rings per molecules Examples of such compounds include the triaziridinyl phosphine oxides or sulfides such as tri(1-ariridinyl)phosphine oxide, tri(2-methyl-1-ariridinyl)phosphine oxide, tri(2-ethyl-3-decyl-1-ariridinyl)phosphine sulfide, and the like.

The multialdehydes are represented by compounds such as 1,4,7-naphthalene tricarboxyaldehyde, 1,7,9-anthracene tricarboxyaldehyde, 1,1,5-pentane tricarboxyaldehyde, and similar multialdehyde containing aliperatic and aromatic compounds. The multiketones can be represented by compounds such as 1,4,9,10-anthraceneterone, 2,3-diacetonylcyclohexanone, and the like. Examples of the multianhydrides include pyromellitic dianhydride, styrene-maleic anhydride copolymers, and the like. Examples of the multiesters include diethyladipate, triethylcitrate, 1,3,5-tricarbethoxybenzene, and the like.

The preferred multihalides are silicon tetrahalides, such as silicon tetrachloride, silicon tetrabromide, and silicon tetraiodide, and the trihalosilanes such as trifluorosilane, trichlorosilane, trichloroethylsilane, tribromobenzylsilane, and the like. Also preferred are the multihalogen-substituted hydrocarbons, such as 1,3,5-tri(bromomethyl)benzene, 2,4,6,9-tetrachloro-3,7-decadiene, and the like, in which the halogen is attached to a carbon atom which is alpha to an activating group such as an ether linkage, a carbonyl group, or a carbon-to-carbon double bond. Substituents inert with respect to lithium atoms in the terminally reactive polymer can also be present in the active halogen-containing compounds. Alternatively, other suitable reactive groups different from the halogen as described above can be present.

Examples of compounds containing more than one type of functional group include 1,3-dichloro-2-propanone, 2,2-dibromo-3-decanone, 3,5,5-trifluoro-4-octanone, 2,4-dibromo-3-pentanone, 1,2,4,5-diepoxy-3-pentanone, 1,2,4,5-diepoxy-3-hexanone, 1,2,11,12-diepoxy-8-pentadecanone, 1,3,18,19-diepoxy-7,14-eicosanedione, and the like.

In addition to the silicon multihalides as described hereinabove, other metal multihalides, particularly those of tin, lead, or germanium, also can be readily employed as coupling and branching agents. Difunctional counterparts of these agents also can be employed. whereby a linear polymer rather than a branched polymer results.

Broadly, and exemplarily, a range of about 0.01 to 4.5 milliequivalents of coupling agent are employed per 100 grams of monomer, presently preferred about 0.01 to 1.5 to obtain the desired Mooney viscosity. The larger quantities tend to result in production of polymers containing terminally reactive groups or insufficient coupling. One equivalent of treating agent per equivalent of lithium is considered optimum amount for maximum branching, if this result is desired in the production line. The coupling agent can be added in hydrocarbon solution, e.g., in cyclohexane, to the polymerization admixture in the final reactor with suitable mixing for distribution and reaction.

Polymers which are made by utilizing the trialkoxybenzene modifiers of this invention in solution polymerizations can be recovered utilizing conventional techniques. In many cases it will be desirable to destroy residual carbon-lithium bonds which may be present in the polymer solution and to recover the synthetic polymer produced. It may also be desirable to add additional antioxidants to the polymer solution in order to further protect the polydiene produced from potentially deleterious effects of contact with oxygen. The polymer made can be precipitated from the polymer solution and any remaining lithium moieties can be inactivated by the addition of lower alcohols, such as isopropyl alcohol, to the polymer solution. The polydiene can be recovered from the solvent and residue by means such as decantation, filtration, centrification, and the like. Steam stripping can also be utilized in order to remove volatile organic compounds.

This invention is illustrated by the following examples which are merely for the purpose of illustration and are not to be regarded as limiting the scope of the invention or the manner in which it can be practiced. Unless specifically indicated otherwise, parts and percentages are given by weight.

EXAMPLES 1-10

A series of experiments were run in order to evaluate 1,2,3-trimethoxybenzene as a catalyst modifier. A premix containing 1,3-butadiene monomer in hexene was prepared for utilization in this series of experiments. It was passed through a silica gel column and stored in a 15 gallon (57 liter) aluminum cask under nitrogen pressure. The premix solution prepared contained about 19 weight percent butadiene monomer. Scavenger level tests were run on the premix solution using conventional techniques. After the scavenger level was determined for the premix solution, scavenger level tests were run on premix solutions containing the trimethoxybenzene modifier. The molar ratio of modifier to lithium was 8. Calculations were made in order to determine any increase that might be needed in the scavenger level due to impurities in the modifier. Accordingly, proportionate adjustments in the scavenger level were made for polymerizations which were carried out using other modifier to lithium ratios. It was determined that $1.25 \times 10^{-3}$ moles per liter of n-butyllithium catalyst should produce polybutadiene having a molecular weight of about 100,000.

A series of 10 bottles were charged with 80 ml of the premix solution containing 1,3-butadiene monomer under a nitrogen blanket. The bottles used in this series of experiments were 4 ounce (118 ml) screw cap polymerization bottles. Modifier and initiator solutions which had been prepared were added through the mouths of the bottles, under a nitrogen blanket, so that the polymerizations could be run with unpunctured cap liners. The bottles were sealed with metal screw caps lined with a self-sealing rubber gasket and a teflon liner facing the solution. The bottles were placed in a water bath which was maintained at about 30° C. as soon as the polymerizations were initiated in order to maximize any exotherm for a rapid polymerization.

The modifier utilized in this series of experiments was added as a 1.0 M solution of 1,2,3-trimethoxybenzene in cyclohexane. Before use, the solution prepared was stored under nitrogen over calcium hydride (CaH$_2$) The polymerizations were generally carried out for at least 24 hours. The polymerizations were terminated by injecting 1 ml of methanol containing 0.1 grams of butylated hydroxy toluene (2,6-di-tert-butyl-4-methyl phenol) into the polymer cement produced.

The amount of 1,2,3-trimethoxybenzene utilized as a modifier is shown in Table I. It is expressed as a molar ratio of the 1,2,3-trimethoxybenzene to lithium in the butyllithium catalyst utilized. Table I also shows the vinyl content of the polybutadiene produced in each of the experiments run.

TABLE I

| Example | Modifier/Li Ratio | Vinyl Content |
|---|---|---|
| 1 | 0.5 | 52% |
| 2 | 1 | 61% |
| 3 | 2 | 66% |
| 4 | 4 | 69% |
| 5 | 6 | 70% |
| 6 | 8 | 71% |
| 7 | 10 | 72% |
| 8 | 12 | 71% |
| 9 | 16 | 72% |
| 10 | 32 | 72% |

As can be readily determined by examining Table I, 1,2,3-trimethoxybenzene acted as a very strong modifier even at low concentrations. For instance, a modifier to lithium ratio of only 0.5 resulted in the synthesis of polybutadiene having a vinyl content of 52%. This is much higher than the vinyl content of polybutadienes which are prepared in similar polymerizations in the absence of a modifier. For instance, such polymerizations generally result in the production of polybutadienes having vinyl contents of only about 10 percent. This series of experiments also shows that polybutadienes can be prepared utilizing 1,2,3-trimethoxybenzene as a modifier which have vinyl contents as high as 72%. Vinyl contents appear to reach a maximum at a modifier to lithium molar ratio of about 4. The utilization of higher amounts of modifier does not significantly increase vinyl contents further. This series of experiments clearly shows that 1,2,3-trimethoxybenzene is a very powerful modifier even at relatively low concentrations.

EXAMPLES 11-20

This series of experiments was conducted using the same procedure as was specified in Examples 1-10 except for the fact that 1,2,4-trimethoxybenzene was utilized as the modifier instead of the 1,2,3-trimethoxybenzene which was utilized as a modifier in Examples 1-10. The results of this series of experiments are summarized in Table II.

TABLE II

| Example | Modifier/Li Ratio | Vinyl Content |
|---|---|---|
| 11 | 0.5 | 55% |
| 12 | 1 | 61% |
| 13 | 2 | 62% |
| 14 | 4 | 65% |
| 15 | 6 | 65% |
| 16 | 8 | 65% |
| 17 | 10 | 65% |
| 18 | 12 | 65% |
| 19 | 16 | 65% |
| 20 | 32 | 64% |

This series of experiments shows that 1,2,4-trimethoxybenzene is a strong modifier at low concentrations. It can be used to prepare polybutadienes having vinyl contents as high as about 65%

COMPARATIVE EXAMPLES 21-30

In this series of experiments 1,3,5-trimethoxybenzene was evaluated as a modifier. The procedure utilized in Examples 1-10 was also carried out in this series of experiments except for the fact that 1,3,5-trimethoxybenzene was utilized as the modifier in place of the 1,2,3-trimethoxybenzene which was used in Examples 1-10. The results of this series of experiments are summarized in Table III.

TABLE III

| Example | Modifier/Li Ratio | Vinyl Content |
|---|---|---|
| 21 | 0.5 | 10% |
| 22 | 1 | 10% |
| 23 | 2 | 10% |
| 24 | 4 | 10% |
| 25 | 6 | 10% |
| 26 | 8 | 11% |
| 27 | 10 | 11% |
| 28 | 12 | 13% |
| 29 | 24 | 15% |
| 30 | 32 | 15% |

This series of experiments shows that 1,3,5-trimethoxybenzene is not a good modifier. At low concentrations it does not increase vinyl contents (see Examples 21-25). Even at high concentrations it does not increase vinyl contents appreciably (see Examples 26-30). In fact, at a modifier to lithium molar ratio of 32, a vinyl content of only 15% was obtained in the polybutadiene produced.

COMPARATIVE EXAMPLES 31-35

This series of experiments was conducted in order to evaluate 1,2-dimethoxybenzene as a catalyst modifier. A procedure similar to the one described in Examples 1-10 was utilized in carrying out this series of experiments except that 1,2-dimethoxybenzene was utilized as the modifier in place of the 1,2,3-trimethoxybenzene which was utilized in Examples 1-10. The results of this series of experiments are summarized in Table IV.

TABLE IV

| Example | Modifier/Li Ratio | Vinyl Content |
|---|---|---|
| 31 | 0.5 | 18% |
| 32 | 1 | 23% |
| 33 | 2.5 | 34% |
| 34 | 5 | 42% |
| 35 | 10 | 47% |

This series of experiments shows that 1,2-dimethoxybenzene can be utilized as a modifier in order to increase the vinyl content of polybutadiene being synthesized utilizing lithium catalysts. However, 1,2-dimethoxybenzene is not as good as a modifier as the trimethoxybenzenes of the present invention. For example, the utilization of a molar ratio of 1,2,3-trimethoxybenzene to lithium of 0.5 results in a vinyl content of 52%; whereas, the utilization of a similar amount of 1,2-dimethoxybenzene results in a vinyl content of only 18% (compare Example 1 with Example 31). Similarly, 1,2,4-trimethoxybenzene is also much better as a modifier at low concentrations than is 1,2-dimethoxybenzene (compare Example 11 with Example 31).

The modifiers of the present invention can also be utilized to prepare polymers with higher vinyl contents than can be attained by utilizing 1,2-dimethoxybenzene as a modifier. More specifically, Examples 1-10 show that 1,2,3-trimethoxybenzene can be used to prepare polymers having vinyl contents of greater than 65 or even 70%. This is, of course, much higher than the maximum vinyl contents that could be attained utilizing 1,2-dimethoxybenzene as the modifier which were determined to be about 50%. Examples 11-20 show that 1,2,4-trimethoxybenzene can also be used in preparing polymers with much higher vinyl contents than those that can be prepared utilizing 1,2-dimethoxybenzene. More specifically, Examples 11-20 show that 1,2,4-trimethoxybenzene can be utilized in the preparation of polydienes having vinyl contents in excess of 60 or even 65%.

While certain representative embodiments and details have been shown for the purpose of illustrating the present invention, it will be apparent to those skilled in this art that various changes and modifications can be made therein without departing from the scope of the present invention.

What is claimed is:

1. A process for preparing a vinyl group containing polymer comprising polymerizing at least one diolefin monomer in the presence of a catalyst system which is comprised of (a) from 0.01 phm to 1 phm of at least one organolithium compound and (b) from 0.1 to about 40 moles of at least one trialkoxybenzene modifier selected from the group consisting of 1,2,3-trianloxybenzenes and 1,2,4-trialkoxybenzenes per mole of the organolithium compound, wherein the alkyl groups in said trialkoxybenzenes contain from 1 to about 10 carbon atoms.

2. A process as specified in claim 1 wherein said trialkoxybenzenes have a structural formula selected from the group consisting of:

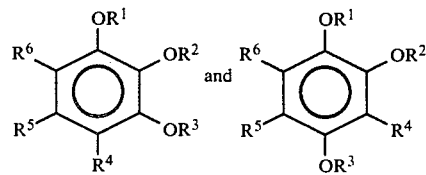

wherein $R^1$, $R^2$, and $R^3$ represent alkyl groups which can be the same or different and which contain from 1 to about 10 carbon atoms; and wherein $R^4$, $R^5$ and $R^6$ can be the same or different and represent hydrogen atoms or alkyl groups which contain from 1 to about 10 carbon atoms.

3. A process as specified in claim 2 wherein $R^1$, $R^2$ and $R^3$ represent alkyl groups which can be the same or different and which contain from 1 to 6 carbon atoms; and wherein $R^4$, $R^5$ and $R^6$ can be the same or different and represent hydrogen atoms or alkyl groups which contain from 1 to 6 carbon atoms.

4. A process as specified in claim 3 wherein $R^1$, $R^2$, and $R^3$ represent alkyl groups which can be the same or different and which contain from 1 to 4 carbon atoms: and wherein $R^4$, $R^5$ and $R^6$ can be the same or different and represent hydrogen atoms or alkyl groups which contain from 1 to 4 carbon atoms.

5. A process as specified in claim 4 wherein $R^4$, $R^5$ and $R^6$ represent hydrogen atoms.

6. A process as specified in claim 5 wherein said diolefin monomers are conjugated diolefin monomers which contain from 4 to 12 carbon atoms.

7. A process as specified in claim 6 wherein said organolithium compound is selected from the group consisting of methyllithium, isopropyllithium, n-butyllithium, sec-butyllithium, tert-octyllithium, n-decyllithium, phenyllithium, 1-naphthyllithium, 4-butylphenyllithium, p-tolyllithium, 4-phenylbutyllithium, cyclohexyllithium, 4-butylcyclohexyllithium, 4- cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butane, 1,8-dilithio-3-decene, 1,2-dilithio-1,8-diphenyloctane, 1,4-dilithiobenzene, 1,4-dilithionaphthalene, 9,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, and 4,4'-dilithiobiphenyl.

8. A process as specified in claim 7 wherein the monomers being polymerized consist of conjugated diolefin monomers containing from 4 to 8 carbon atoms.

9. A process as specified in claim 8 wherein said polymerization is carried out in an organic solvent at a temperature in the range of about −20° C. to about 150° C.

10. A process as specified in claim 9 wherein said conjugated diolefin monomers are selected from the group consisting 1,3-butadiene and isoprene.

11. A process as specified in claim 10 wherein said trialkoxybenzene modifier is selected from the group consisting of 1,2,3-trimethoxybenzene and 1,2,4-trimethoxybenzene.

12. A process as specified in claim 11 wherein the mole ratio of the trialkoxybenzene modifier to lithium in the lithium catalyst is within the range of 0.25 to 15.

13. A process as specified in claim 12 wherein said vinyl group containing polymer is polybutadiene and wherein said conjugated diolefin monomer is 1,3-butadiene.

14. A process as specified in claim 13 wherein the trialkoxybenzene modifier is 1,2,3-trimethoxybenzene.

15. A process as specified in claim 14 wherein the polybutadiene produced has a vinyl content of at least 65%.

16. A process as specified in claim 13 wherein the trialkoxybenzene modifier is 1,2,4-trimethoxybenzene.

17. A process as specified in claim 16 wherein the polybutadiene produced has a vinyl content of at least 60%.

18. A process as specified in claim 14 wherein the polybutadiene produced has a vinyl content of at least about 70%.

19. A process as specified in claim 16 wherein the polybutadiene produced has a vinyl content of about 65%.

20. A process as specified in claim 14 wherein the mole ratio of the trialkoxybenzene modifier to lithium in the lithium catalyst is within the range of about 0.5 to 10 and wherein said polymerization is carried out at a temperature within the range of about 30° C. to about 125° C.

21. A process as specified in claim 11 wherein the mole ratio of the trialkoxybenzene modifier to lithium in the lithium catalyst is within the range of about 1 to about 5.

22. A process as specified in claim 21 wherein from 0.01 tp 0.1 phm of the organolithium compound is present and wherein said polymerization is carried out at a temperature within the range of about 30° C. to about 125° C.

23. A process as specified in claim 9 wherein the mole ratio of the trialkoxybenzene modifier to lithium in the lithium catalyst is within the range of about 0.5 to 10.

* * * * *